UNITED STATES PATENT OFFICE.

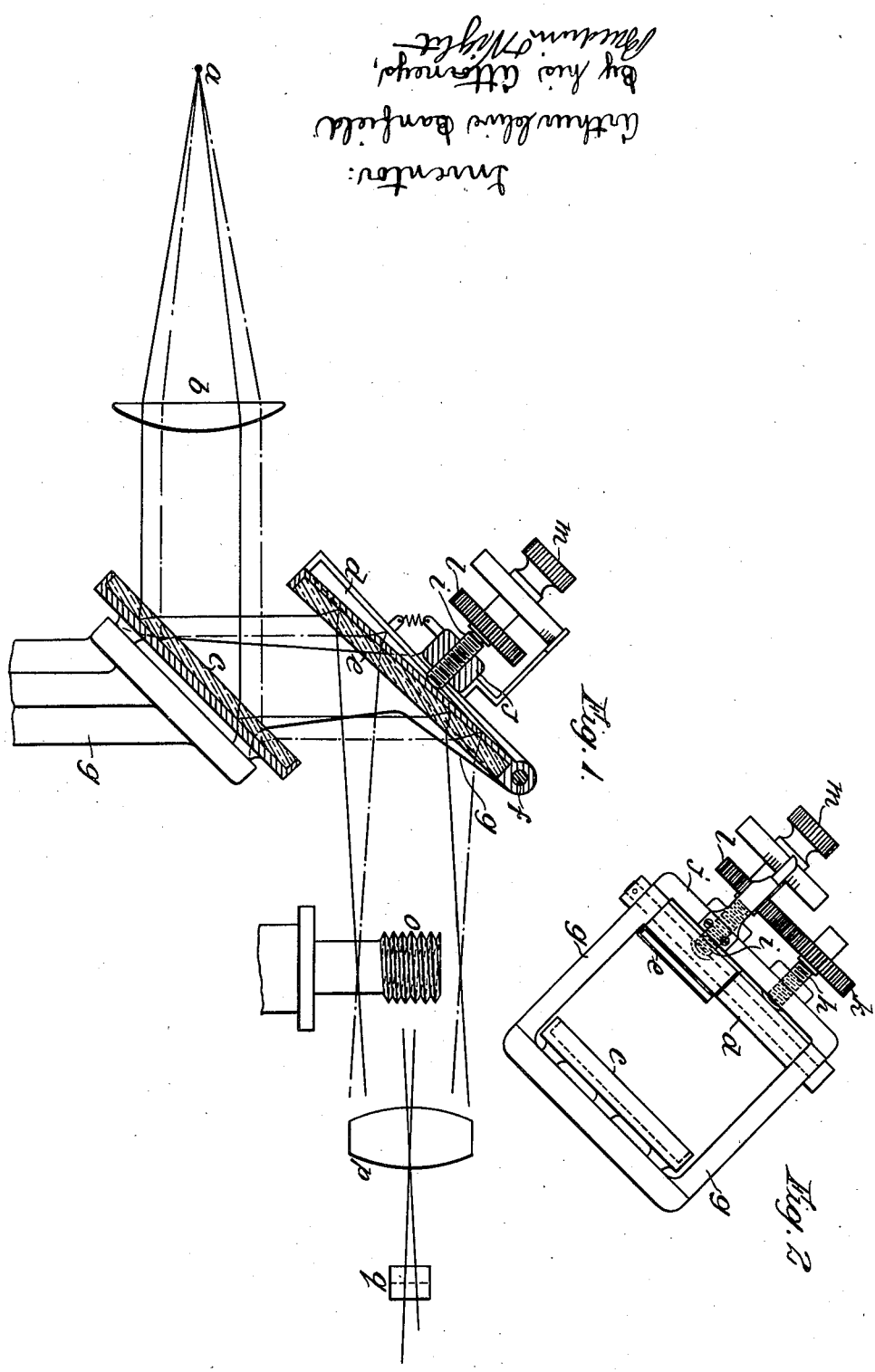

ARTHUR CLIVE BANFIELD, OF LONDON, ENGLAND, ASSIGNOR TO ADAM HILGER, LIMITED, OF LONDON, ENGLAND.

PROJECTION APPARATUS FOR GAUGING SCREW THREADS.

1,421,057.   Specification of Letters Patent.   Patented June 27, 1922.

Application filed January 12, 1921. Serial No. 436,679.

*To all whom it may concern:*

Be it known that I, ARTHUR CLIVE BANFIELD, a subject of the King of Great Britain, residing at 75a Camden Road, London, England, have invented new and useful Improvements in Projection Apparatus for Gauging Screw Threads, of which the following is a specification.

This invention relates to projection apparatus for gauging screw threads, and has for its object to overcome what is known as helix angle interference. Helix angle interference is the phenomenon which occurs in the attempt to produce on a screen by optical projection an orthogonal projection of an axial section of a screw thread. In such an attempt, where the pitch of the thread exceeds a certain limit part of the light is intercepted by the two flanks of the threads at positions on one side of the threads nearer to the light source, and on the other side of the threads farther from the light source, than the axial section it is desired to project.

The result of helix angle interference is to make the effective diameter of the thread appear too large in the projected image.

At the same time my invention results in more perfect definition in the projected image.

According to this invention, I direct the light along the screw threads on both sides of the screw in directions parallel to the slope of the helix on the two sides. This may be effected by two mirrors which are pivotally mounted side by side and means are provided for turning the mirrors through equal angular distances in opposite directions.

The beam of light is reflected on to the mirrors which are turned through an angle dependent on the angle of the helix so that part of the beam is deflected upwards along the threads on one side of the screw, and the other part of the beam is deflected downwards along the threads on the other side of the screw, and the images of the two opposite contours of the screw are projected on to a screen by known means.

The mirrors may be operated by screws having toothed pinions which intermesh so that when one screw is turned in one direction, the other screw is turned in the reverse direction.

The annexed drawing illustrates an apparatus for carrying out the method of directing a light upon a screw thread.

Figure 1 is a side elevation partly in section and Figure 2 is a front elevation of the mirrors.

$a$ is a source of light which passes through a condenser $b$ to a plain mirror $c$ from which the light is reflected on to two mirrors $d$ and $e$ having a common pivot $f$, the mirror $c$ and the pivot $f$ being mounted on a standard $g$. The mirrors $d$ and $e$ are held at any desired angle against the action of springs by screws $h$ and $i$ which pass through the top $j$ of the standard $g$. On the screws $h$ and $i$ are toothed wheels $k$ and $l$ respectively which mesh together and turn in opposite directions when the screw $i$ is turned by means of the milled head $m$. Thus by turning the milled head $m$ the mirrors $d$ and $e$ are turned through equal angular distances in opposite directions and the light from the mirror $d$ is deflected downwards along the threads of a screw $o$ on its further side whilst the light from the mirror $e$ is deflected upwards along the threads on its nearer side. $p$ is a lens and $q$ a reversing prism by means of which the images of the two opposite contours of the screw are projected.

What I claim is:—

1. In projection apparatus for gauging screw threads, a source of light, two pivotally mounted mirrors receiving light therefrom, means for supporting a screw in the path of the beams reflected from the mirrors, and means for simultaneously turning the mirrors through equal angular distances in opposite directions to deflect light along the screw threads on each side of the screw being gauged.

2. In projection apparatus for gauging screw threads, a source of light, two pivotally mounted mirrors receiving light therefrom, means for supporting a screw in the path of the beams reflected from the mirrors, two rotary members each engaging a mirror and toothed wheels upon the members intermeshing so that the members are rotated in opposite directions and move the mirrors to deflect light along the screw threads on each side of the screw being gauged.

3. In projection apparatus for gauging screw threads, a source of light, a stationary mirror receiving light therefrom, two pivotally mounted mirrors upon which the light is reflected by the stationary mirror, means for supporting a screw in the path of the beams reflected from the movable mirrors, manually operable means for simultaneously turning the movable mirrors through equal angular distances in opposite directions to deflect light along the screw threads on each side of the screw, and means for determining the degree of adjustment.

In testimony that I claim the foregoing as my invention I have signed my name this twenty ninth day of December, 1920.

ARTHUR CLIVE BANFIELD.